United States Patent
Sin et al.

(10) Patent No.: US 7,336,608 B2
(45) Date of Patent: Feb. 26, 2008

(54) METHOD FOR ADJUSTING A TRANSMISSION RATE TO OBTAIN THE OPTIMUM TRANSMISSION RATE IN A MOBILE AD HOC NETWORK ENVIRONMENT

(75) Inventors: Jin-hyun Sin, Seoul (KR); Byung-in Mun, Suwon-si (KR); Song-yean Cho, Seoul (KR); Hyuck Yoo, Seoul (KR); See-hwan Yoo, Seoul (KR); Jin-hee Choi, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 746 days.

(21) Appl. No.: 10/888,008

(22) Filed: Jul. 12, 2004

(65) Prior Publication Data

US 2005/0083850 A1 Apr. 21, 2005

(30) Foreign Application Priority Data

Oct. 18, 2003 (KR) .................. 10-2003-0072784

(51) Int. Cl.
*H04J 1/16* (2006.01)
*H04L 12/26* (2006.01)

(52) U.S. Cl. ..................... 370/232; 370/253

(58) Field of Classification Search ........... 370/230, 370/230.1, 232–234, 252–253, 328, 332, 370/333, 338, 395.21, 395.52, 465
See application file for complete search history.

(56) References Cited

U.S. PATENT DOCUMENTS

2002/0154602 A1 10/2002 Garcia-Luna-Aceves et al.

2003/0202499 A1* 10/2003 Thron et al. ................ 370/342

FOREIGN PATENT DOCUMENTS

| JP | 11-177618 A | 7/1999 |
| KR | 2003-0044465 A | 7/2001 |
| KR | 2001-0058119 A | 6/2003 |

OTHER PUBLICATIONS

Zhou et al. "Improve TCP performance in Ad hoc network by TCP-RC", the 14th IEEE Sep. 2003 International Symposium on Personal, Indoor and Mobile Radio Communication Proceedings.*
Hur et al. "TCP Flow Control Based on an Instantaneous Model", SICE Annual Conference in Fukui, Japan, Aug. 4-6, 2003.*
Yang et al. "General AIMD Congestion Control", Department of Computer Sciences, the University of Texas at Austin, 0-7695-0921 May 2000 IEEE.*

* cited by examiner

*Primary Examiner*—Kwang Bin Yao
*Assistant Examiner*—Tung Q. Tran
(74) *Attorney, Agent, or Firm*—Sughrue Mion, PLLC

(57) ABSTRACT

A method for adjusting a transmission rate in the transmission control protocol (TCP) under a mobile ad hoc network environment, including calculating a difference value (Diff) between the current transmission rate (cur_bw) and the previous transmission rate (base_bw), setting up upper and lower thresholds by calculating the standard variation (base-bw_var) of the previous transmission rate, and updating the previous transmission rate to the current transmission rate depending upon a comparison result of Diff and the size of the upper and lower thresholds.

11 Claims, 11 Drawing Sheets

FIG. 3

| absorption | 1 | 2 | 3 | 4 | 5 | 6 | 7 | 8 | 9 |
|---|---|---|---|---|---|---|---|---|---|
| Reno | 18 | 215 | 10933 | 8926 | 9645 | 11029 | 13746 | 13609 | 15278 |
| Vegas | 1 | 125 | 10008 | 11161 | 12295 | 13745 | 13284 | 12934 | 14024 |

**NUMBER OF TRANSMISSION FAILED PACKETS
OBTAINED THROUGH TRACE FILE ANALYSIS**

METHOD FOR ADJUSTING A TRANSMISSION RATE TO OBTAIN THE OPTIMUM TRANSMISSION RATE IN A MOBILE AD HOC NETWORK ENVIRONMENT

This application claims priority from Korean Patent Application No. 10-2003-0072784 filed on Oct. 18, 2003 in the Korean Intellectual Property Office, the disclosure of which is incorporated herein by reference.

BACKGROUND OF THE INVENTION

1. Field of the Invention

The present invention relates, in general, to a method for adjusting a transmission rate to obtain the optimum transmission rate in an ad hoc network environment, and more particularly, to a method for adjusting a transmission rate to obtain the optimum transmission rate appropriate for an ad hoc network environment wherein an upper threshold and a lower threshold are set by calculating a difference (Diff) between a current transmission rate (cur_bw) and a previous transmission rate (base_bw), and a standard variation (base-bw_var) of the previous transmission rate, wherein a congestion window (hereinafter referred to as "cwnd") increases or decreases depending upon the result of the comparison between the Diff and the dimension of the upper and lower thresholds, and the previous transmission rate is then updated to the current transmission rate.

2. Description of the Related Art

There are several related art materials. Korean Patent Unexamined Publication No. 10-2001-0058119 relates to a method for controlling congestion of a TCP (Transmission Control Protocol) Vegas, thereby improving a convergence speed of TCP Vegas, with consideration of exponential increase and decrease of a CWND (Congestion Window) as well as linear increase and decrease thereof, and, finally, enhancing the TCP performance Korean Patent Unexamined Publication No. 10-2003-044465 relates to a method for controlling congestion of a transmission control protocol (TCP) by use of TCP Vegas to thereby decrease abrupt congestion of the network and allow the network to be used in an efficient manner by adding $x^1$ and $x^2$ to $\alpha$ and $\beta$.

US Utility Patent Unexamined Publication No. 2002-0154602 relates to a method for improving TCP performance over wireless links, and JP Patent Unexamined Publication No. 11-177618 relates to a method for controlling congestion to attain impartiality of band reservation between a band according to the Reno algorithm and other bands according to other algorithms, intermingled with each other on the same network where reduction rate of a CWND is changed by use of a selective acknowledgement (SACK).

A mobile ad hoc network (hereinafter referred to as "MANET") environment refers to a network environment wherein a network is constructed dynamically when necessary without any fixed infrastructure is constructed based on mobile terminals. FIG. 1 is a diagram illustrating a concept of an ad hoc network system. In the MANET employing IEEE802.11, all nodes share a communication channel. Accordingly, all the nodes within the same communication region make communication through the same channel, for which data are likely to be collided and lost in the course of transmission. Also, reliability in transmission on the link layer would be sharply deteriorated due to an inherent feature of the wireless network. A transmitter transmits a packet to a receiver and the receiver transmits an acknowledgement (ACK)-response packet to the received packet to the transmitter. Since the ACK-response packet contains information on the maximum values of the sequence numbers of subsequent packets received at that time, the data amount transmitted by the transmitter should not be reduced even when a part of the ACK-response packet is lost.

Transmission control protocol (TCP) is in the transport layer among Transmission control protocol/Internet protocol (TCP/IP) architectures and mainly functions to control flow and error of data. If data to be transmitted is stored in a buffer by an application program, data equal to a window in size is only transmitted by the TCP. At this time, the window size is determined depending upon a destination host or a congestion of the network and may increase or decrease. By using this concept of a window, utilization of the wireless link can be maximized.

In a conventional TCP congestion control algorithm, the congestion is abruptly generated because of a simple exponential increase of the transmission rate in the first stage, and the network has not been so efficiently used because of unconditional reduction of the transmission rate by half in the congestion state.

FIG. 2A is a graph showing a change in transmission rate in TCP-Reno version according to a conventional art and FIG. 2B is a graph showing a change in transmission rate in TCP-Vegas version according to a conventional art. In the conventional TCP, adjustment of transmission rate is performed through two phases.

The first phase is called a slow start phase during which any bandwidth available for use is probed (see FIG. 2A). A state of the network is monitored by increasing the data amount to be transmitted at high speed until any available bandwidth is located. If the data amount exceeds a threshold for a slow start (ssthreshold) defined in advance while it is on the increase, this phase is entered into a phase to control the data amount to be transmitted, depending upon the state of the network, called a congestion avoidance phase under which the data amount for transmission increases slowly.

In the slow start phase, the previous congestion window (cwnd) increases twice per round trip time (hereinafter referred as "RTT"), i.e., time consumed in round trip transmission of data. Meanwhile, the cwnd increases so that data is transmitted in addition to one packet per RTT in the congestion avoidance phase.

In the TCP-Vegas version, the maximum bandwidth available for use and the bandwidth currently in use are calculated based on the RTT. Where the bandwidth currently in use is far less than the maximum bandwidth available for use, the TCP strives to use the bandwidth at maximum by increasing the transmission rate. Where the bandwidth currently in use is approximate to the maximum bandwidth, the TCP strives to maintain packets as small as possible in the network by decreasing the transmission rate. This is illustrated in FIG. 2B.

However, this conventional transmission method controls the transmission rate only when packet loss occurs due to inevitable transmission of excessive data over the data amount available for transmission to the network, for which there is a big load to the network. Especially, in terms of the property of an ad hoc network, the amount of data available for transmission largely varies depending upon the circumstances, differently from a wired network. The link layer has a technique to avoid collision and a mechanism for retransmission as well, and thus, to increase the transmission rate consecutively until the packet loss is generated would give the whole network a big load and causes consecutive timeouts of the TCP. This operation would result in a sharply deteriorating efficiency of the network resource.

FIG. 3 is a table showing comparison between TCP-Reno version and TCP-Vegas version according to a conventional art in terms of the number of transmission failure packets. The transmission rate controlling method such as the TCP-Vegas version is very advantageous in an ad hoc network. However, it can be understand from the table shown in FIG. 3 that this TCP-Vegas shows no big difference from the TCP-Reno version in the number of packets discarded in the network.

Since the network resource has been used but it failed in transmission, the network resource has not efficiently been used. Further, failure of the transmission causes transmission of other sessions to be obstructed. Where any background traffic exists in the ad hoc network, the problems described above would be further worsened. In the case of TCP-Vegas version, since the time until an ACK packet reaches is measured in RTT, generation of the ACK packet is maintained with the level in existing wired network, and thus, there would be excessive use of wireless network resources versus the actual need thereof. Also, data amount for transmission is controlled on this basis, and it is not reasonable to correct this error.

SUMMARY OF THE INVENTION

The present invention is conceived to solve the aforementioned problems. An aspect of the present invention is to provide a method for TCP control to maximize use of the network resource of TCP by correcting a conventional method for controlling data amount to be transmitted in TCP and obtain the optimum transmission rate in a mobile ad hoc network by adopting a method for reducing collision.

According to an exemplary embodiment of the present invention, there is provided a method for adjusting transmission rate in the transmission control protocol (TCP) under a mobile ad hoc network environment, comprising the steps of calculating a difference value (Diff) between the current transmission rate (cur_bw) and the previous transmission rate (base_bw), setting up upper and lower thresholds by calculating the standard variation (basebw_var) of the previous transmission rate, and updating the previous transmission rate to the current transmission rate depending upon a comparison result of Diff and the size of the upper and lower thresholds.

The previous transmission rate may be calculated from $$\text{base\_bw} = \frac{cwnd}{baseRTT}$$

and the current transmission rate may be calculated from $$\text{cur\_bw} = \frac{cwnd}{curRTT},$$

and the difference value (Diff) is calculated from Diff=cur_bw−base_bw where cwnd refers to a congestion window, baseRTT refers to the time consumed in round transmission of data measured previously, and curRTT refers to the time consumed in round transmission of data measured currently.

The standard variation of the previous transmission rate may be calculated from $(\text{basebw\_var}) = \sqrt{(1-\alpha) \cdot (\text{basebw\_var})_{before}^2 + \alpha \cdot (\text{Diff})^2}$ where $\alpha$ is a parameter to indicate an average of weighted values and $(\text{basebw\_var})_{before}$ corresponds to the standard variation at the previous time value.

Preferably in the updating step, Diff may be compared in size with the upper threshold where Diff is positive and Diff may be compared in size with the lower threshold where Diff is negative, and thereafter, the previous transmission rate is updated to the current transmission rate.

Also in the updating step, a congestion window may increase and then the previous transmission rate may be updated to the current transmission rate where Diff is positive and is larger than the upper threshold, and the congestion window may not change and the previous transmission rate may be updated to the current transmission rate where Diff is negative and is larger than the lower threshold.

Preferably in the setting step, the upper and lower thresholds may be set to ±k*basebw_var where k is a constant having the value of one or greater). At this time in the updating step, a congestion window may increase and then the previous transmission rate may be updated to the current transmission rate where Diff is positive and is larger than the upper threshold, and the congestion window may decrease and the previous transmission rate may then be updated to the current transmission rate where Diff is negative and is less than the lower threshold.

The updating step may further comprise a step of adjusting the congestion window adaptively to a slow start threshold where the congestion window is less than the slow start threshold.

BRIEF DESCRIPTION OF THE DRAWINGS

The above and other objects, features and advantages of the present invention will become apparent from the following description of preferred embodiments given in conjunction with the accompanying drawings, in which:

FIG. 3 is a table showing a comparison between TCP-Reno version and TCP-Vegas version according to a conventional art in the number of transmission failure packets;

DETAILED DESCRIPTION OF THE INVENTION

Hereinafter, a transmission control method to obtain the optimum transmission rate in a mobile ad hoc network will be described in detail with reference to the accompanying drawings.

Figure 1:
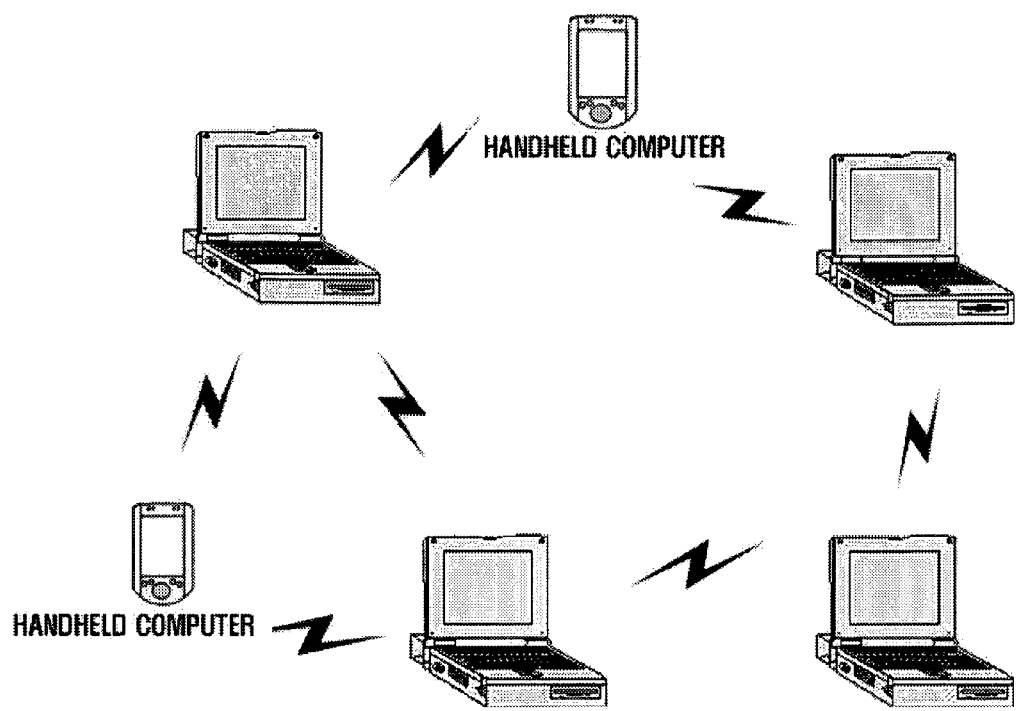
FIG. 1 is an exemplary view illustrating a concept of a mobile ad hoc network system.
Figure 2A:
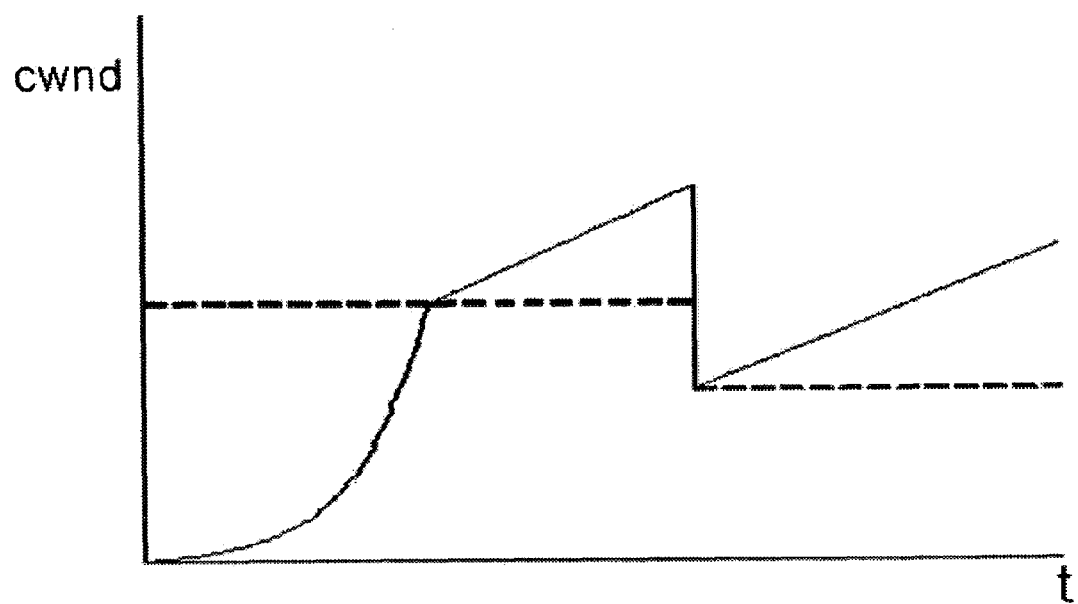
FIG. 2A is an exemplary graph illustrating a change in transmission rate in TCP-Reno version according to a conventional art.
Figure 2B:
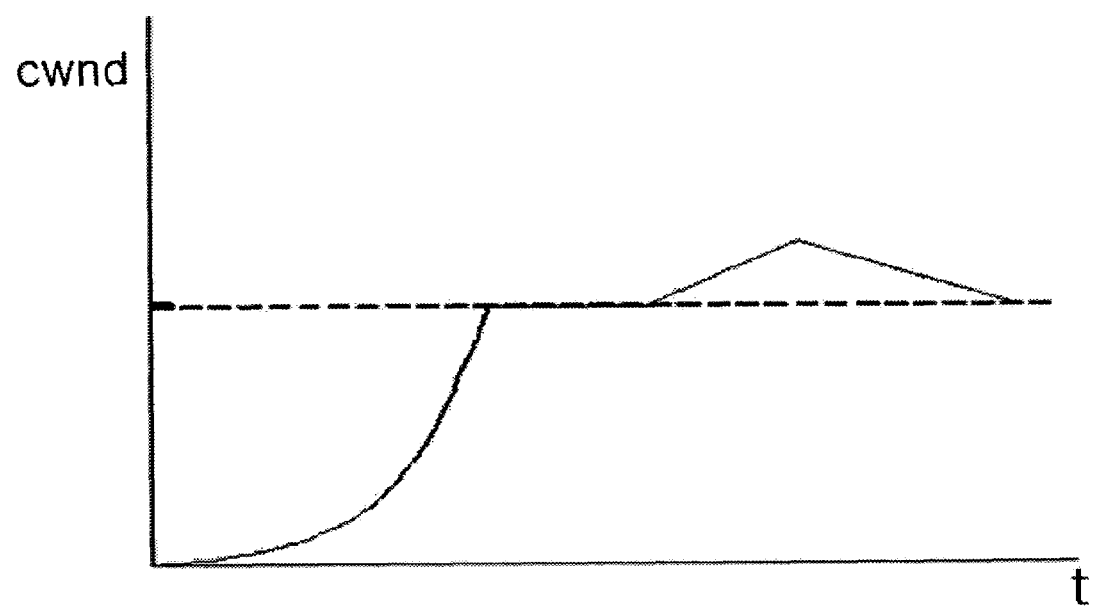
FIG. 2B is an exemplary graph illustrating a change in transmission rate in a TCP-Vegas version according to a conventional art.
Figure 4:
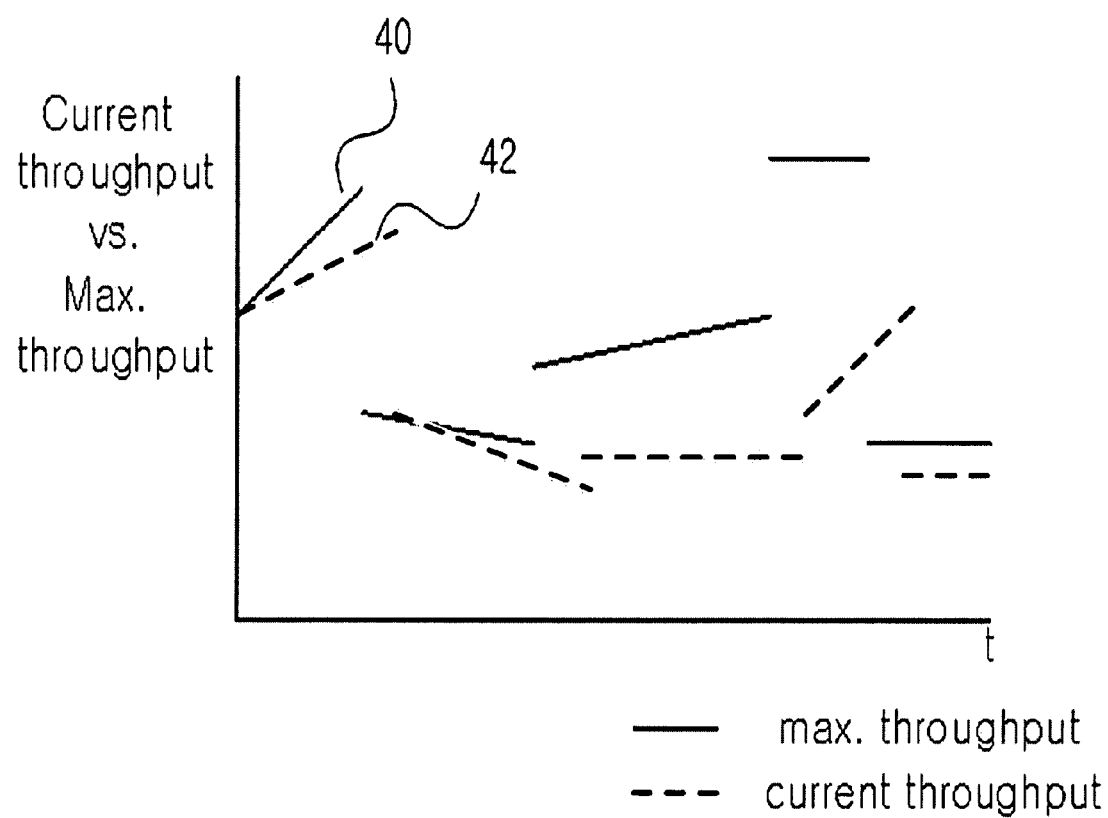
FIG. 4 is a graph showing a comparison of current throughput and maximum throughput.

In FIG. 4, the current throughput is compared with the maximum throughput. As shown, since it can know that the maximum throughput 40 is sharply changed in the ad hoc network as time changes and a state change of network can be estimated through comparison with the current throughput 42, the transmission rate can be controlled on the TCP transmitter side. Thus, it can be understood that the method of controlling the current throughput 42 is very important.

Figure 5:
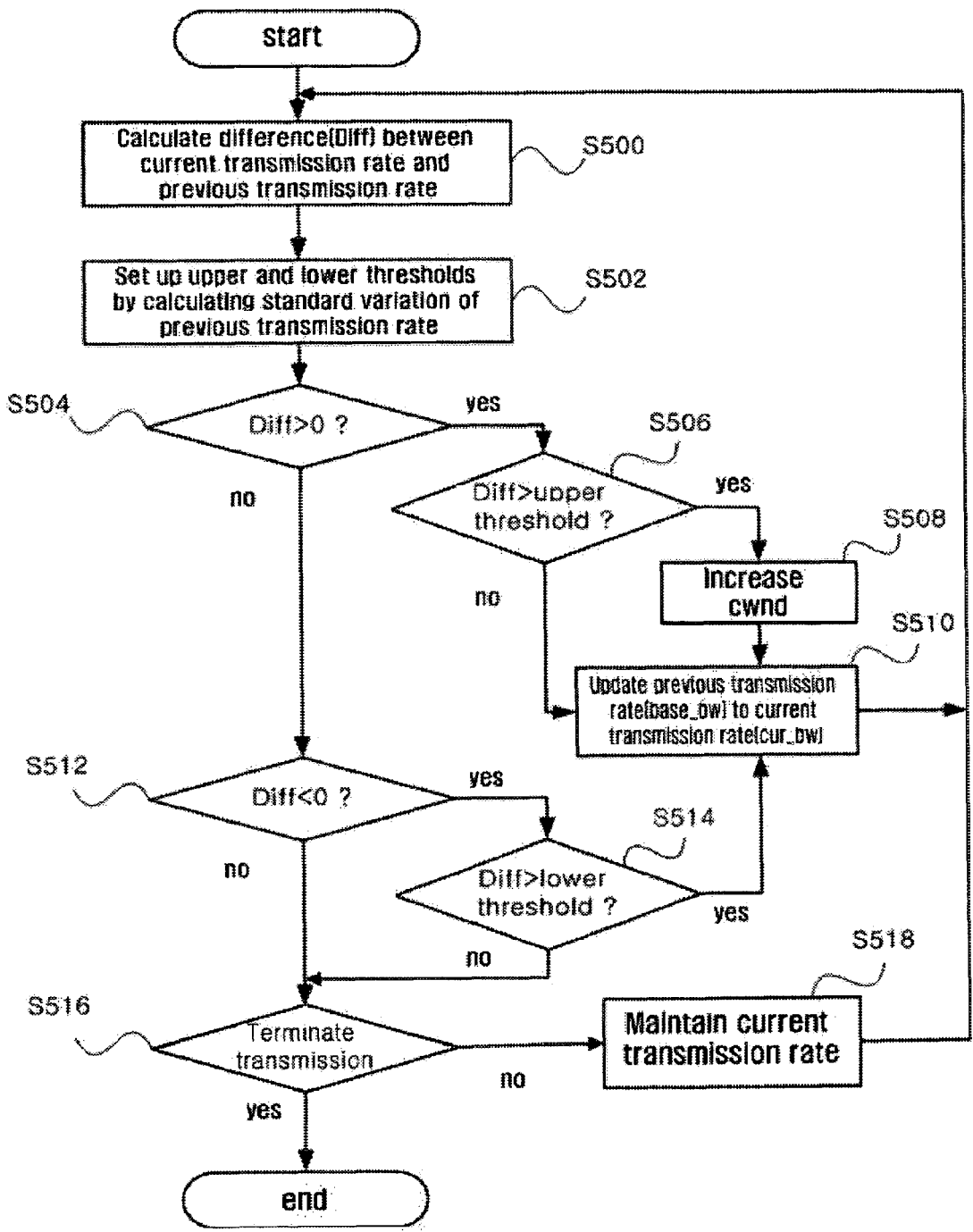
FIG. 5 is a flow chart illustrating a transmission control method to obtain the optimum transmission rate in a mobile ad hoc network environment according to one aspect of the present invention.
Figure 6:
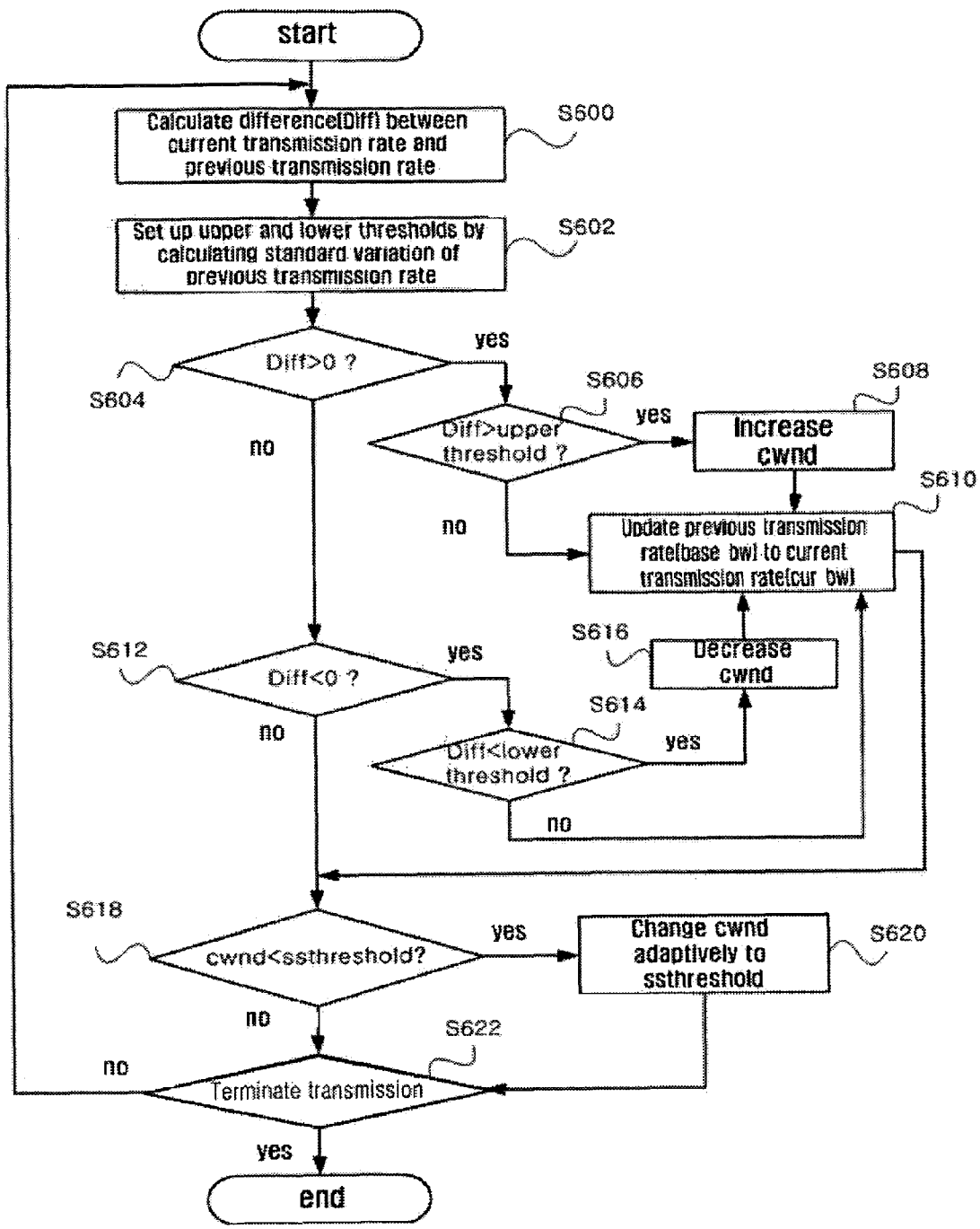
FIG. 6 is a flow chart illustrating a transmission control method to obtain the optimum transmission rate in a mobile ad hoc network environment according to another aspect of the present invention.

FIG. 5 is a flow chart illustrating a transmission control method to obtain the optimum transmission rate in a mobile ad hoc network environment according to one aspect of the present invention, and FIG. 6 is a flow chart illustrating a transmission control method to obtain the optimum transmission rate in a mobile ad hoc network environment according to another aspect of the present invention.

The TCP transmitter does not transmit one packet at a time but only transmits packets equal to the amount that the network can transmit, which is controlled by a congestion window (cwnd).

Transmission is conducted in two phases. Initially, a slow start phase starts for transmission, which has a purpose of locating any bandwidth appropriate for the network. When the data amount transmitted by RTT is excessive over the predetermined threshold (ssthresh), transmission enters into a congestion avoidance phase to control a cwnd so as to locate a state in which little congestion is generated depending upon a state of the network. FIG. 5 describes the initial slow start phase and FIG. 6 describes the congestion avoidance phase.

A TCP transmitter having received a new ACK determines the current transmission rate as $$\text{cur\_bw} = \frac{cwnd}{curRTT}$$

where curRTT refers to the time consumed in current data round transmission. A previous transmission rate, an initial value of the bandwidth available for use at the first packet exchange time is calculated as $$\text{base\_bw} = \frac{cwnd}{baseRTT}$$

where baseRTT refers to the time consumed in previous data round transmission. The current transmission rate (cur_bw) is continually updated after the initial value of the transmission rate (base-bw) is set up, and the base_bw is set to the current transmission rate (cur_bw) only when updating of base_bw is needed. Then, the difference between the current transmission rate (cur_bw) and the initial value of the transmission rate (base_bw), Diff, is calculated S500 and S600 in FIGS. 5 and 6, respectively. The DIFF is obtained by deducting base-bw from cur_bw, which is used to identify a state of the current network. A value of DIFF is calculated at every packet exchange; however, since a value of RTT does not change in many cases, actual change thereof occurs when the RTT is updated.

After obtaining information on the current state of the network, steps which can be taken in the respective slow start and congestion avoidance steps to reduce load on the network and use, the maximum bandwidth will be described below.

Two thresholds to determine state changes in the slow start and congestion avoidance phases are set up. Calculating the standard variation of base_bw, positive standard variation value is established as a upper threshold and negative standard variation value is established as a lower threshold S502 and S602.

Basically, a large amount of data are requested to obtain the standard variation. Current transmission rate serves as the data for that purpose. Where the current transmission rate consecutively changes, a new standard variation per packet must be calculated. Thus, the overhead in calculating a value of the standard variation increases extra largely. Thus, instead of actually obtaining the standard variation, it is advantageous to employ such approximation as (basebw_var)=$\sqrt{(1-\alpha) \cdot (\text{basebw\_var})_{before}^2 + \alpha \cdot (\text{Diff})^2}$ where $\alpha$ is a parameter to indicate an average of weighted values and (basebw_var)$_{before}$ corresponds to the standard variation at the previous time value. The reason for using them is to overcome some problems caused because the values of $\alpha$ and $\beta$ in the existing TCP-Vegas version need to be adjusted according to the state of things.

To consider the slow start phase first, upper and lower thresholds are first set up S502 and it is determined whether Diff has a positive value S504. When the value of Diff is positive, it is compared with the upper threshold in size S506. If Diff is larger than the upper threshold, it means that the current state of transmission is good, and thus, cwnd increases S508. Then, the previous transmission rate (base_bw) is updated to the current transmission rate (cur_bw) S510. Where Diff is not larger than the upper threshold, cwnd does not change and the previous transmission rate (base_bw) is directly updated to the current transmission rate (cur_bw) S510.

Where the value of Diff is not positive, it is determined that the value is negative S512. Where Diff is negative, it means that the current state of transmission is not good, in comparison with the previous state of transmission, and thus, it is compared in size with the lower threshold S514. Where the value of Diff is larger than the lower threshold, cwnd does not change, and the previous transmission rate (base_bw) is directly updated to the current transmission rate (cur_bw) S510. Where the value of Diff is not larger than the lower threshold or the Diff is zero (0), the transmission rate is not updated and it is determined whether the transmission is to be terminated S516. If there is a need to continue the transmission, the current transmission rate is maintained S518. After than, the step is fed back to the initial step S500 to calculate a value of Diff S500.

It is important to update the previous transmission rate (base_bw) to the current transmission rate (cur_bw) because the slow start phase is a process to locate any appropriate base_bw and thus the base_bw value set up in the slow start phase serves as the reference to determine a congestion state of the network in the congestion avoidance phase.

In the slow start phase, if the current Diff value moves in the range of upper and lower thresholds, the base_bw value is updated without changing the cwnd value. Especially, only when Diff is positive and exceeds the upper threshold, the cwnd value increases and then base_bw is updated to thereby enhance the utilization of the network resource.

In the slow start phase, the upper threshold is set to as +basebw_var and the lower threshold is set to as −basebw_var, but, in the congestion avoidance phase, the upper and lower thresholds can be set by multiplying them by k, namely ±k*basebw_var (where k is a constant having the value of one or more than), to thereby decrease the increase/decrease range of the data amount to be transmitted. An embodiment in FIG. 6 depicts a case when k is 1.

To consider the congestion avoidance phase, the Diff value is calculated S600 and the upper and lower thresholds are set at S602 as in the slow start phase.

It is determined whether the Diff value is positive S604. If the Diff value is determined to be positive, it is compared in size with the upper threshold S606. Where the Diff value is larger than the upper threshold, it means that the current transmission state is good, and thus, the cwnd value increases S608. Thereafter, the previous transmission rate (base_bw) is updated to the current transmission rate (cur bw) S610. Where the Diff value is not larger than the upper threshold, the previous transmission rate (base_bw) is directly updated to the current transmission rate (cur_bw) without changing the CWND value S610.

Where the value of Diff is not positive, it is determined whether the value is negative S612. Where Diff is negative, it means that the current state of transmission is not good, in comparison with the previous state of transmission, and thus, it is compared in size with the lower threshold S614. If it is less than the lower threshold, it means that the current transmission state is very bad, and thus, the cwnd value decreases S616. Then, the transmission rate is updated S610. However, when it is not less than the lower threshold, the transmission rate is directly updated without changing the cwnd value S610.

After passing through the updating step, it is determined whether the cwnd value decreases below the slow start threshold S618. Where the Diff value is neither positive nor negative but is merely zero (0), it is determined whether the cwnd value decreases below the slow start threshold S618.

If the cwnd value is less than the slow start threshold, it indicates that there remains large space to which packets are sent. Thus, after the cwnd value is adapted to the slow start threshold S620, it is determined whether to terminate the transmission S622. Even where the cwnd value is not less than the slow start threshold, it is determined whether to terminate the transmission S622. Thereafter, where there is a need to continue the transmission, the step is returned to the initial step S600.

In the congestion avoidance phase, the cwnd size is adaptively adjusted so as to adjust the transmission rate only when the Diff value exceeds the range from the upper to lower thresholds, to thereby avoid overload on the network.

Figure 7A:
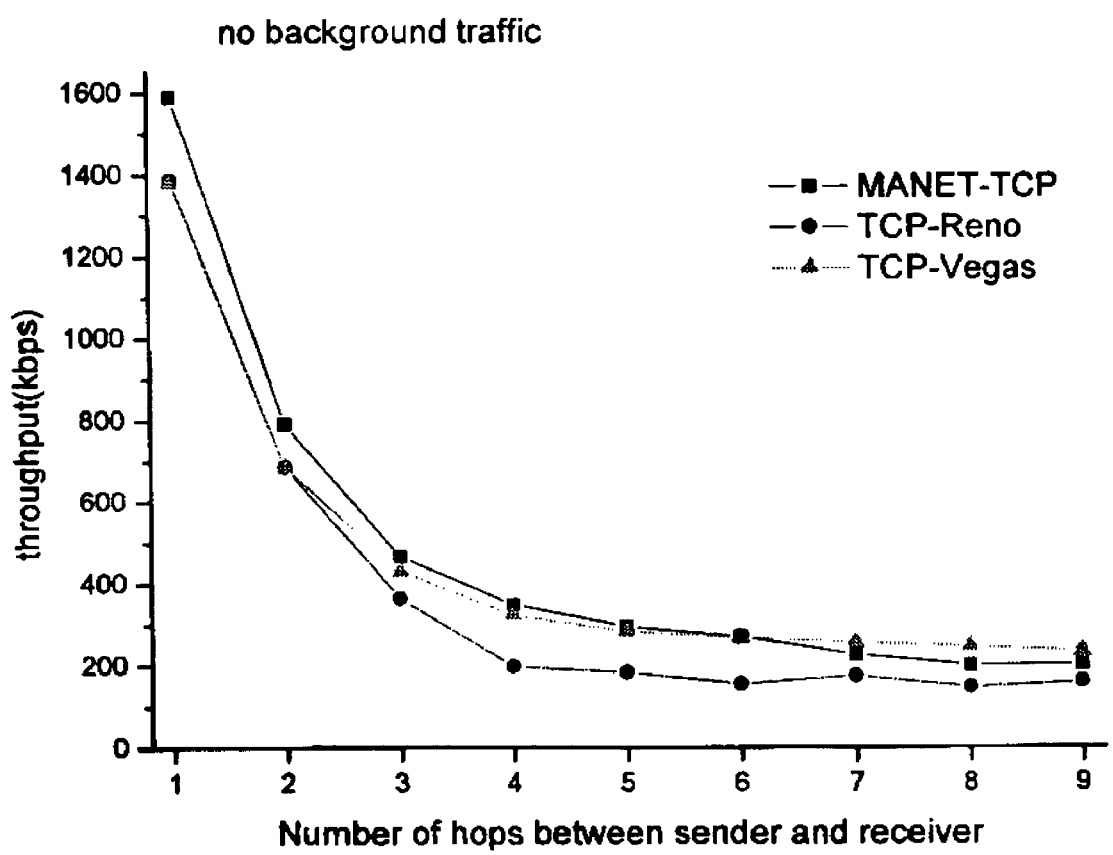
FIGS. 7A and 7B are graphs illustrating comparisons of throughput according to one aspect of the present invention and throughputs according to conventional TCP-Reno and TCP-Vegas versions.
Figure 7B:
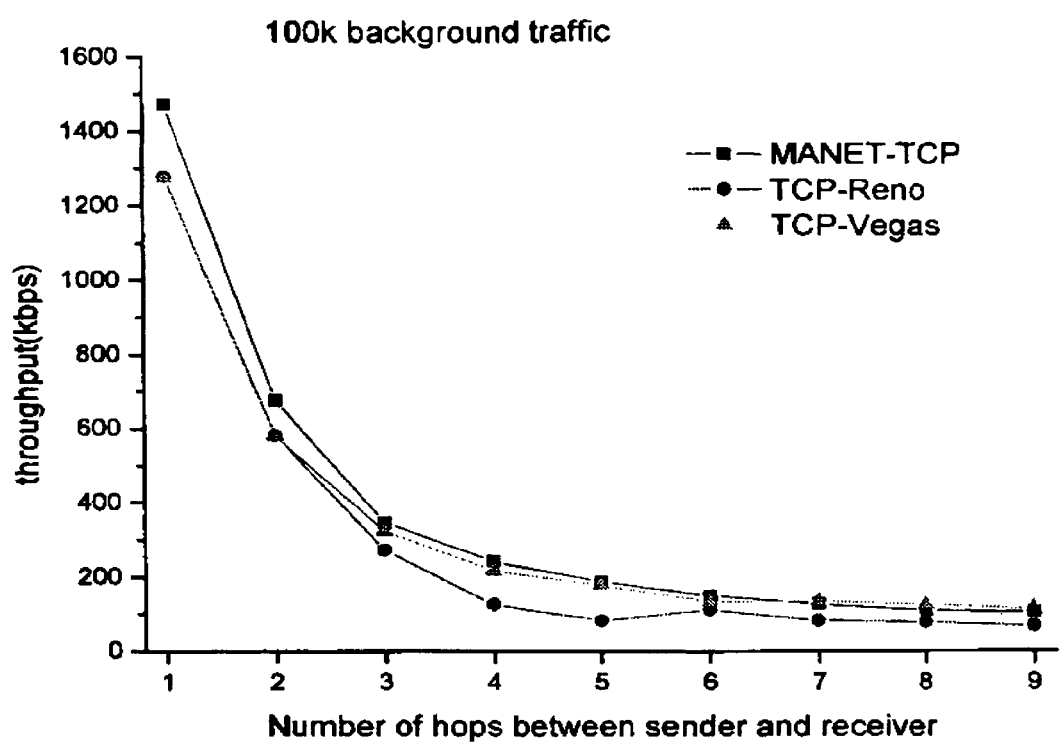

FIGS. 7A and 7B are graphs illustrating comparisons of throughput according to one aspect of the present invention and throughputs according to conventional TCP-Reno and TCP-Vegas versions. FIG. 7A shows the comparison where there exists no background traffic whereas FIG. 7b shows the comparison where there exists background traffic. Considering a simulation according to the present invention, the throughput in the present invention is higher than those in the conventional TCP-Reno and TCP-Vegas versions regardless of existence of background traffic.

Figure 8A:
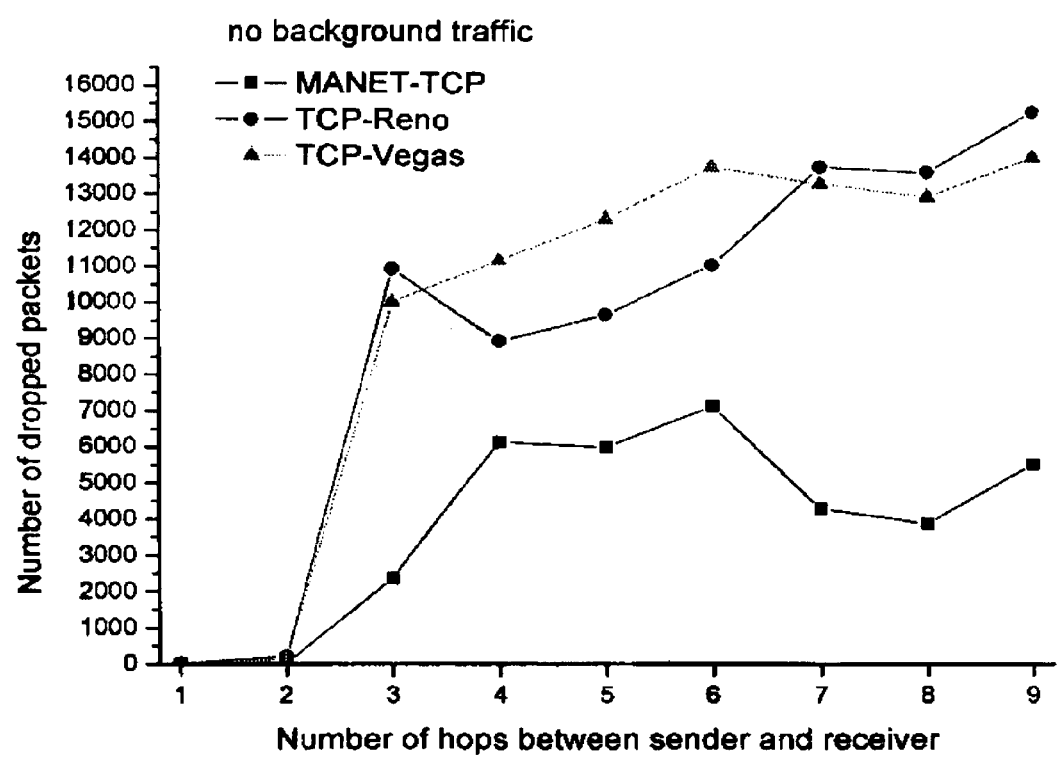
FIGS. 8A and 8B are graphs illustrating comparisons of the number of packets lost in one aspect of the present invention and the number of packets lost in conventional TCP-Reno and TCP-Vegas versions.
Figure 8B:
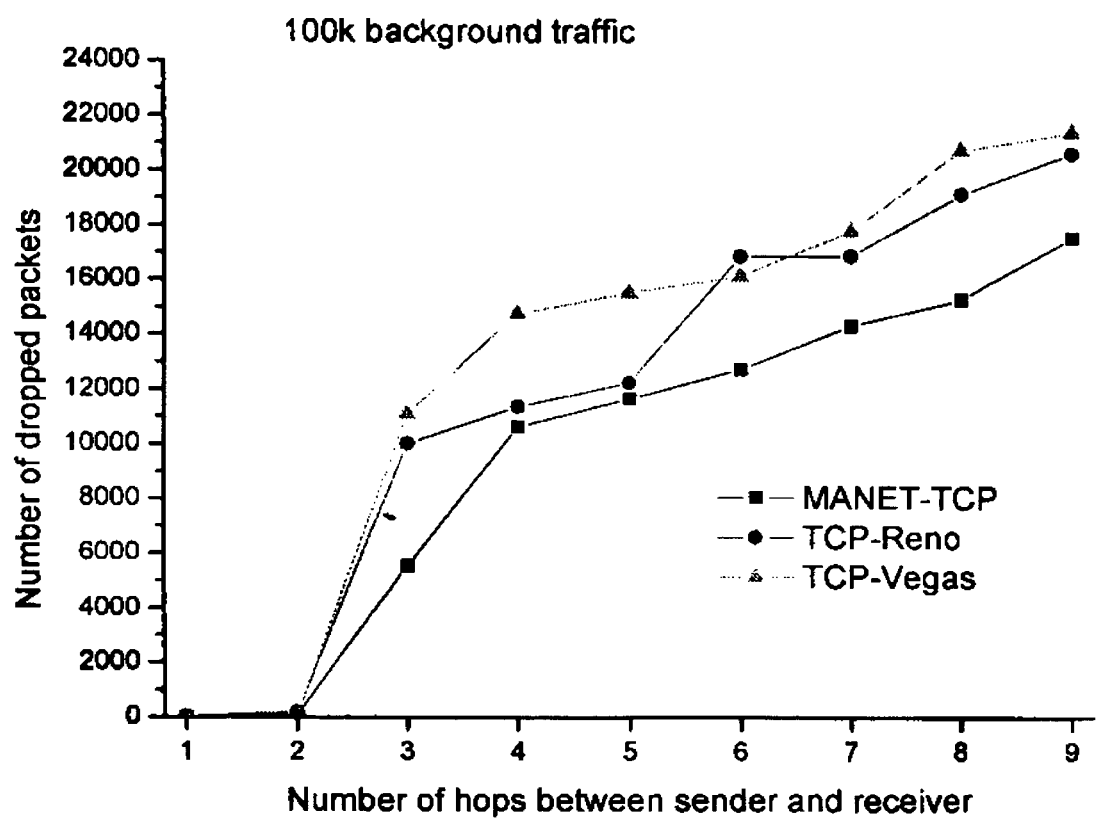

FIGS. 8A and 8B are graphs illustrating comparisons of the number of packets lost in one aspect of the present invention and the number of packets lost in conventional TCP-Reno and TCP-Vegas versions. Likewise, FIG. 8A shows the comparison where there exists no background traffic whereas FIG. 8b shows the comparison where there exists background traffic. Considering a simulation according to the present invention, the number of lost packets in the present invention is less than those in the conventional TCP-Reno and TCP-Vegas versions regardless of existence of background traffic.

According to the present invention, even through the transmission rate increases or decreases, the cwnd value is not directly changed. If the Diff value exists in the range of the variation values usually generated, the previous transmission rate is updated to the current transmission rate without changing the cwnd, to thereby improve the transmission state.

As described above, there has been provided a method to obtain the optimum transmission rate in the current network state. With the use of the method, the network transmission rate to keep track of the optimum transmission rate according to the network state as shown in FIG. 4 is estimated and on this basis, the transmission rate is adjusted to increase the transmission rate of the ad hoc network and prevent the performance of the ad hoc network using the wireless local area network (LAN) from being deteriorated.

Further, packet loss in the network is reduced and the throughput is maintained at a high status, and thus, use of the network resources is more efficient than existing methods. In particular, like effects are implemented even when the background traffic increases.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

What is claimed is:

1. A method for adjusting a transmission rate in a transmission control protocol (TCP) under a mobile ad hoc network environment, comprising:

calculating a difference value (Diff) between a current transmission rate (cur_bw) and a previous transmission rate (base_bw);

setting up an upper threshold and a lower threshold by calculating a standard variation (basebw_var) of the previous transmission rate; and updating the previous transmission rate to the current transmission rate depending upon a comparison result of Diff and a size of the upper threshold and the lower threshold.

2. The method as claimed in claim 1, wherein the previous transmission rate is calculated from $$\text{base\_bw} = \frac{cwnd}{baseRTT}$$

and the current transmission rate is calculated from $$\text{cur\_bw} = \frac{cwnd}{curRTT},$$

and the difference value (Diff) is calculated from Diff=cur_bw−base_bw where cwnd refers to a congestion window, baseRTT refers to a time consumed in round trip transmission of data measured previously, and curRTT refers to the time consumed in round trip transmission of data measured currently.

3. The method as claimed in claim 1, wherein the standard variation of the previous transmission rate is calculated from (base_var)=$\sqrt{(1-\alpha)\cdot(\text{basebw\_var})_{before}^2+\alpha\cdot(\text{Diff})^2}$ where $\alpha$ is a parameter to indicate an average of weighted values and (basebw_var)$_{before}$ corresponds to a standard variation at the previous time value.

4. The method as claimed in claim 1, wherein in the updating step, Diff is compared in size with the upper threshold when Diff is positive, and Diff is compared in size with the lower threshold when Diff is negative, and thereafter, the previous transmission rate is updated to the current transmission rate.

5. The method as claimed in claim 2, wherein in the updating step, Diff is compared in size with the upper threshold when Diff is positive, and Diff is compared in size with the lower threshold when Diff is negative, and thereafter, the previous transmission rate is updated to the current transmission rate.

6. The method as claimed in claim 3, wherein in the updating step, Diff is compared in size with the upper threshold when Diff is positive, and Diff is compared in size with the lower threshold when Diff is negative, and thereafter, the previous transmission rate is updated to the current transmission rate.

7. The method as claimed in claim 4, wherein in the updating step, a congestion window increases and then the previous transmission rate is updated to the current transmission rate when Diff is positive and is larger than the upper threshold, and the congestion window does not change and the previous transmission rate is updated to the current transmission rate when Diff is negative and is larger than the lower threshold.

8. The method as claimed in claim 5, wherein in the updating step, a congestion window increases and then the previous transmission rate is updated to the current transmission rate when Diff is positive and is larger than the upper threshold, and the congestion window does not change and the previous transmission rate is updated to the current transmission rate when Diff is negative and is larger than the lower threshold.

9. The method as claimed in claim 6, wherein in the updating step, a congestion window increases and then the previous transmission rate is updated to the current transmission rate when Diff is positive and is larger than the upper threshold, and the congestion window does not change and the previous transmission rate is updated to the current transmission rate when Diff is negative and is larger than the lower threshold.

10. The method as claimed in claim 1, wherein in the setting up step, the upper threshold and lower threshold are set to ±k*basebw_var where k is a constant having the value of one or more, and in the updating step, a congestion window increases and then the previous transmission rate is updated to the current transmission rate when Diff is positive and is larger than the upper threshold, and the congestion window decreases and the previous transmission rate is then updated to the current transmission rate when Diff is negative and is less than the lower threshold.

11. The method as claimed in claim 10, wherein the updating step further comprises adjusting the congestion window adaptively to a slow start threshold where the congestion window is less than the slow start threshold.

* * * * *